United States Patent [19]

Fujitani et al.

[11] 4,367,166

[45] Jan. 4, 1983

[54] STEAM REFORMING CATALYST AND A METHOD OF PREPARING THE SAME

[75] Inventors: Yoshiyasu Fujitani; Hideaki Muraki, both of Nagoya; Makoto Tomita, Obu; Hideo Sobukawa, Nagoya; Masayuki Fukui, Toyoake, all of Japan

[73] Assignee: Kabushiki Kaisha Toyota Chuo Kenkyusho, Aichi, Japan

[21] Appl. No.: 282,587

[22] Filed: Jul. 13, 1981

[30] Foreign Application Priority Data

Jul. 17, 1980 [JP] Japan ................................. 55-98276

[51] Int. Cl.³ ...................... B01J 21/04; B01J 21/10; B01J 23/10; B01J 23/46
[52] U.S. Cl. .................................... 252/462; 252/457; 423/652
[58] Field of Search ............. 252/457, 462; 48/214 A; 423/652

[56]  References Cited

U.S. PATENT DOCUMENTS 3,222,132 12/1965  Dowden ............................. 423/652
4,060,498 11/1977  Kawagoshi et al. ............. 252/462 X
4,283,308  8/1981  Ohara et al. ......................... 252/435

*Primary Examiner*—W. J. Shine
*Attorney, Agent, or Firm*—Oblon, Fisher, Spivak, McClelland & Maier

[57]  ABSTRACT

A catalyst for the steam reforming of hydrocarbons into gases such as methane, hydrogen and carbon monoxide and a method of preparing the same. The catalyst which comprises cerium oxide and rhodium supported on a carrier can maintain high catalytic activity and durability for steam reforming without any carbon deposition on its surface.

8 Claims, No Drawings

4,367,166

STEAM REFORMING CATALYST AND A METHOD OF PREPARING THE SAME

BACKGROUND OF THE INVENTION

1. Field of the Invention

This invention relates to a catalyst for the steam reforming of hydrocarbons, and a method of preparing the same.

2. Description of the Prior Art

In the production of synthetic gas, fuel gas or the like by steam reforming of hydrocarbons, it has hitherto been usual to use natural gas consisting mainly of methane, but it has recently been found more desirable to employ relatively heavy hydrocarbons, or hydrocarbons containing aromatic or unsaturated hydrocarbons.

These hydrocarbons are, however, likely to deposit carbon on the catalyst surface during the steam reforming operation, and thereby impair the activity of the catalyst. It has, therefore, been proposed to supply a highly excessive quantity of steam to hydrocarbons during the steam reforming operation, but this method has failed to provide any satisfactory result.

A need, therefore, continues to exist for a catalyst for the steam reforming of hydrocarbons which can maintain high catalytic activity and durability without causing any carbon deposition.

SUMMARY OF THE INVENTION

Accordingly, one object of the invention is to provide a catalyst for the steam reforming of hydrocarbons which has no carbon deposition on its surface.

Another object is to provide a catalyst for the steam reforming of hydrocarbons which exhibits high catalytic activity.

A further object of the invention is to provide a catalyst for the steam reforming of hydrocarbons which has high mechanical strength and superior durability at high temperatures.

A still further object is to provide a catalyst for the steam reforming of hydrocarbons which exhibits high catalytic activity in a wide range of temperature from 300° C. to 1,000° C.

It is another object to provide a method for producing the catalyst for the steam reforming of hydrocarbons which has the aforesaid superior characteristics.

Briefly these objects and other objects of the invention as hereinafter will become more readily apparent can be attained by providing a catalyst for the steam reforming of hydrocarbons, said catalyst comprising cerium oxide and rhodium as a catalyst ingredient supported on a carrier.

DETAILED DESCRIPTION OF THE PREFERRED EMBODIMENTS

According to this invention, it is possible to provide a catalyst which can maintain high catalytic activity and durability for steam reforming without having any carbon deposite on its surface. The catalyst of this invention can exhibit high catalytic activity in a wide range of temperature from 300° C. to 1,000° C. A gas which is mainly rich in methane, hydrogen and carbon dioxide is produced in a relatively low temperature range, and a gas composed mainly of hydrogen, carbon monoxide or the like in a relatively high temperature range.

For the purpose of this invention, the carrier may be a porous body of a material such as α-alumina, δ-alumina, cordierite, and magnesia alumina spinel.

It is particularly preferable to use a porous body of magnesia alumina spinel ($MgAl_2O_4$) as the carrier for the catalyst according to the method of this invention. Magnesia alumina spinel has a high mechanical strength at a high temperature, and even if it is used at a high temperature, there does not occur any change in the crystal structure of magnesia alumina spinel, hence no reduction in the surface area or mechanical strength of the carrier is observed. Thus, this material for the carrier contributes significantly to a good duration of high catalytic activity at a high temperature.

Magnesia alumina spinel shows an extremely high degree of activity in a steam reforming reaction of hydrocarbons in particular, since the aforesaid spinel is closer to neutral than alumina in the chemical properties of its surface.

The catalyst of this invention preferably contains 0.5% to 50% by weight of cerium oxide ($CeO_2$) and 0.01 to 10% by weight of rhodium (Rh), based on the carrier. If the amount of cerium oxide or rhodium is less than the respective ranges thereof, the advantages of this invention do not manifest themselves satisfactorily. Even if, on the other hand, any excess amount is used, it is difficult to expect any correspondingly improved result.

The catalyst as hereinabove described may be prepared by an ordinary method for supporting a catalyst ingredient on the carrier. For example, the carrier is immersed for impregnation in a solution of materials for forming the catalyst ingredient such as cerium nitrate and rhodium nitrate, dried, and calcined.

If a porous body of magnesia alumina spinel is used to form the carrier, it is possible to prepare the catalyst by mixing powders of magnesia and alumina, molding the mixed powder into a desired shape, sintering the molded product by heating to form a porous sintered body, and supporting the catalyst ingredient on the porous sintered body as hereinabove described.

According to this method, it is preferable that the alumina powder has a particle diameter of 100 Å to 15,000 Å (1.5 microns). If there is any deviation from this range of particle diameter, there results a reduction in the catalytic activity for steam reforming, and it is difficult to obtain such a catalyst of high quality as hereinabove described. The term "particle diameter" as herein used means a weight-averge particle diameter. The magnesia powder serves as an excellent binder for the alumina powder. There is no limitation in particular to the particle diameter of the magnesia powder, but it is preferable to use a magnesia powder having a particle diameter of 0.1 to 500 microns in order to have it mix substantially uniformly with the alumina powder to form a spinel therewith, and obtain a porous sintered carrier having a substantially uniform pore diameter.

The proportion of the alumina powder to the magnesia powder (alumina powder/magnesia powder) is preferably in the range 1.5 to 10 by weight. If the proportion by weight of the alumina powder is less than 1.5, the amount of magnesia is so large that magnesia particles undergo crystallization when heated for sintering purposes. This results in the formation of big crystals composed of magnesia alone, and therefore, the decrease in the pore number of the carrier. There is also every likelihood that alumina may be enclosed by the excess amount of magnesia. If, on the other hand, the proportion by weight of alumina is greater than 10, the amount of magnesia may be too small to bind alumina with the result that the mechanical strength of the carrier is reduced.

The mixed powder of alumina and magnesia is preferably heated at a temperature of 1,000° C. to 1,600° C. for sintering purposes. If it is heated at any temperature below 1,000° C., there is every likelihood that no satisfactory sintering may take place, and that there may not be formed a sufficient amount of magnesia alumina spinel ($MgAl_2O_4$) to provide a satisfactorily strong catalyst in mechanical strength. On the other hand, any temperature that is higher than 1,600° C. brings about excessive overgrowth of magnesia alumina spinel ($MgAl_2O_4$) particles, and therefore, a reduction in the pore volume of the carrier. More preferably, the mixed powder is heated at a temperature of 1,200° C. to 1,600° C., so that at least 75% of magnesia and alumina may react with each other to form a magnesia alumina spinel ($MgAl_2O_4$) which will provide a catalyst having higher thermal stability and mechanical strength.

When the mixed powder is sintered, a small quantity of an organic paste, such as dextrin, is admixed into the mixed powder, the resulting mixture is molded into pieces of any desired shape by a "Marumerizer" (a tablet forming machine) or the like, and these pieces are heated in an electric furnace or the like.

The porous sintered body obtained by using an alumina powder having a particle diameter in the aforesaid range has an average pore diameter of about 200 Å to 15,000 Å.

The mixed powder may be molded into any desired shape, such as granular, columnar or honeycomb. For the economical use of the fine alumina powder, it is possible to prepare a matrix such as granular and honeycomb of alumina or the like separately from the present invention, coat the matrix with the mixed powder according to this invention, mold the coated product into a desired shape and sinter the molded product by heating so that a carrier having the aforesaid spinel formed in its surface layer may be produced. Then, the catalyst ingredient may be supported on the carrier to prepare the catalyst of the present invention.

EXAMPLE 1

Several catalysts were prepared according to this invention by using a porous body of alumina-magnesia spinel as a carrier for each catalyst.

A magnesia powder having an average particle diameter of 0.5 micron was mixed with each of four kinds of alumina powder having an average particle diameter of 400 Å, 1,500 Å, 5,000 Å and 10,000 Å, respectively. After 1% by weight of dextrin was added to each mixed powder, they were fully mixed together, and the resulting mixture was molded by a "Marumerizer" (a tablet forming machine) into spherical pellets each having a diameter of about 3 mm. The proportion of each alumina powder to the magnesia powder was 2.8 by weight.

The pellets were placed in an electric drier, and dried at 110° C. for about 12 hours. Then, they were placed in an electric furnace, and heated at 1,350° C. for 10 hours for sintering purposes, whereby a porous sintered body as the carrier for each catalyst was obtained. The properties of the sintered bodies thus obtained are shown in TABLE 1.

Then, each carrier was immersed for impregnation in an equeous solution of cerous nitrate, and after it was calcined at 600° C. for three hours in the air, whereby cerium oxide ($CeO_2$) was supported on the carrier. THe supporting of rhodium was likewise performed by using an aqueous solution of rhodium nitrate. Thus, several catalysts according to this invention were prepared (see TABLE 2).

For the evaluation of each catalyst for its activity, each catalyst was placed in a quartz tube, and was heated to and maintained at 500° C. Then, a mixed gas containing steam and n-heptane was fed into the tube. The mixed gas contained 24.4 mols of steam for each mol of n-heptane. A space velocity of 15,000 per hour was employed.

The activity of each catalyst was determined by way of the conversion rate of n-heptane which was examined at the intitial period and after five hours. The results are shown in TABLE 3. The term "initial period" means the time when the reaction begins, and the term "after five hours" means the time when five hours have passed since the "initial period". The term "conversion rate" as herein used means the percentage (%) of reaction of n-heptane with steam.

For comparison purposes, catalysts Nos. C1 and C2 were likewise prepared by supporting cerium oxide or rhodium on carrier No. 4 prepared as hereinabove described, and were likewise evaluated for their activity. Further details of these comparative catalysts and the results of their evaluation are likewise shown in TABLE 2 and 3.

TABLE 1

| Carrier No. | Alumina Powder particle diameter (Å) | Pore volume (cm³/g) | Average pore diameter (Å) | Surface area (m²/g) | |
|---|---|---|---|---|---|
| 1 | 400 | 0.24 | 600 | 15 | |
| 2 | 1,000 | 0.30 | 1,600 | 4 | This |
| 3 | 5,000 | 0.30 | 3,000 | 4 | Invention |
| 4 | 10,000 | 0.32 | 5,000 | 3 | |

TABLE 2

| Catalyst No. | Carrier No. | Amount of CeO₂ (wt. %) | Amount of Rh (wt. %) | |
|---|---|---|---|---|
| 1 | 1 | 6 | 0.25 | |
| 2 | 2 | 6 | 0.25 | This |
| 3 | 3 | 6 | 0.25 | Invention |
| 4 | 4 | 6 | 0.25 | |
| C1 | 4 | 6 | — | Comparative |
| C2 | 4 | — | 0.25 | Examples |

TABLE 3

| Catalyst No. | Conversion rate (%) | | |
|---|---|---|---|
| | Initial period | After five hours | |
| 1 | 89 | 86 | |
| 2 | 87 | 85 | This |
| 3 | 86 | 84 | Invention |
| 4 | 87 | 86 | |
| C1 | 0 | 0 | Comparative |
| C2 | 53 | 45 | Examples |

It is evident from the above tables that the catalyst of this invention have extremely higher catalytic activity than Comparative Catalysts Nos. C1 and C2. Catalyst No. C1 containing cerium oxide alone as a catalyst ingredient hardly possesses any function of steam reforming.

No deposition of carbon was found on the surface of any of the catalysts according to this invention during the aforesaid reaction.

EXAMPLE 2

Several catalysts containing different amounts of catalyst ingredient were prepared by using a porous body of magnesia-alumina spinel or α-alumina as the carrier, and their activity was determined.

The procedures of EXAMPLE 1 were repeated for preparing the spinel carrier, except the a γ-alumina powder having an average particle diameter of 5,000 Å and a magnesia powder having an average particle diameter of 1 micron were employed. The carrier had a surface area of 10 m²/g. Each α-alumina carrier was prepared by heating a commercially available δ-alumina carrier having a surface area of 100 m²/g and a diameter of 3 mm at 1,200° C. for three hours, whereby δ-alumina was converted to α-alumina.

The catalyst ingredient was supported on each carrier as hereinabove described in EXAMPLE 1, whereby several catalysts according to this invention were prepared. The amounts of the catalyst ingredients on each catalyst thus obtained are shown in TABLE 4.

These catalysts were evaluated for their activity as hereinbefore described in EXAMPLE 1. TABLE 5 shows the conversion rates observed during the initial period and after five hours, and the ratio of the conversion rate observed after five hours to the intital conversion rate during the initial period.

TABLE 5 also contains the results of evaluation on Comparative Catalysts each containing cerium oxide or rhodium alone as a catalyst ingredient supported on the α-alumina carrier. The amount of the catalyst ingredient on these catalysts is shown in TABLE 4 (Catalysts Nos. C3 and C4).

TABLE 4

| Catalyst No. | Carrier | Amount of CeO₂ (wt. %) | Amount of Rh (wt. %) | |
|---|---|---|---|---|
| 5 | Spinel | 1 | 0.25 | |
| 6 | " | 3 | 0.25 | |
| 7 | " | 6 | 0.25 | |
| 8 | " | 15 | 0.25 | This |
| 9 | " | 6 | 0.1 | Invention |
| 10 | " | 6 | 0.5 | tion |
| 11 | " | 6 | 0.1 | |
| 12 | α-alumina | 3 | 0.25 | |
| 13 | " | 6 | 0.25 | |
| C3 | " | 6 | — | Comparative |
| C4 | " | — | 0.25 | Examples |

TABLE 5

| Catalyst No. | Conversion rate (%) Initial period | Conversion rate (%) After five hours | Ratio of conversion rates (after five hours/initial period) |
|---|---|---|---|
| 5 | 82 | 81 | 0.99 |
| 6 | 85 | 83 | 0.97 |

TABLE 5-continued

| Catalyst No. | Conversion rate (%) Initial period | Conversion rate (%) After five hours | Ratio of conversion rates (after five hours/initial period) |
|---|---|---|---|
| 7 | 87 | 86 | 0.99 |
| 8 | 90 | 87 | 0.97 |
| 9 | 86 | 85 | 0.99 |
| 10 | 90 | 85 | 0.94 |
| 11 | 95 | 91 | 0.96 |
| 12 | 73 | 68 | 0.93 |
| 13 | 75 | 68 | 0.91 |
| C3 | 0 | 0 | — |
| C4 | 50 | 40 | 0.80 |

As is obvious from TABLES 4 and 5, the CeO₂-Rh catalysts according to this invention show a higher "ratio of conversion rates" than the comparative catalysts, and therefore, a higher degree of durability. No deposition of carbon was found on the surface of any of the catalysts according to this invention during the aforesaid reaction.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A catalyst for the steam reforming of hydrocarbons which consists essentially of cerium oxide and rhodium as a catalyst ingredient supported on a carrier, wherin said catalyst contains 0.5 to 50% by weight cerium oxide and 0.01 to 10% by weight rhodium, based on said carrier.

2. The catalyst according to claim 1, wherein said carrier is a porous body of magnesia alumina spinel.

3. The catalyst according to claim 1, wherein said carrier is a porous body of a material selected from the group consisting of α-alumina, δ-alumina and cordierite.

4. The catalyst according to claim 1, wherein an average pore diameter of said carrier ranges from 200 A to 15,000 Å.

5. A method of producing the catalyst of claim 2, which comprises:
   mixing a magnesia powder with an alumina powder having an average particle diameter of 100 Å to 15,000 Å;
   molding the mixed powder into a desired shape;
   sintering the molded product by heating to form a porous sintered body; and
   supporting cerium oxide and rhodium as a catalyst ingredient on said porous sintered body as a carrier.

6. The method according to claim 5, wherein an average particle diameter of the alumina powder ranges from 0.1 to 500 μm.

7. The method according to claim 5, wherein the proportion of the alumina powder to the magnesia powder ranges from 1.5 to 10 by weight.

8. The method according to claim 5, wherein said molded product is sintered by heating at a temperature ranging from 1,200° C. to 1,600° C.

* * * * *